United States Patent
Kountz et al.

(10) Patent No.: US 11,799,166 B2
(45) Date of Patent: Oct. 24, 2023

(54) LI-ION BATTERY HAVING IMPROVED SAFETY AGAINST COMBUSTION

(71) Applicant: THE CHEMOURS COMPANY FC LLC, Wilmington, DE (US)

(72) Inventors: Dennis J. Kountz, West Chester, PA (US); Alan D. English, Chadds Ford, PA (US); Paul Douglas Brothers, Chadds Ford, PA (US); James R. Hoover, Newark, DE (US); Donna Lynn Visioli, Lower Gwynedd, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 573 days.

(21) Appl. No.: 16/583,740

(22) Filed: Sep. 26, 2019

(65) Prior Publication Data
US 2020/0052266 A1 Feb. 13, 2020

Related U.S. Application Data

(63) Continuation of application No. 14/755,160, filed on Jun. 30, 2015, now Pat. No. 10,566,592.
(Continued)

(51) Int. Cl.
*H01M 50/383* (2021.01)
*H01M 10/42* (2006.01)
(Continued)

(52) U.S. Cl.
CPC ....... *H01M 50/383* (2021.01); *H01M 10/058* (2013.01); *H01M 10/0525* (2013.01);
(Continued)

(58) Field of Classification Search
CPC ........... H01M 10/058; H01M 10/4235; H01M 50/143; H01M 50/30; H01M 50/383
See application file for complete search history.

(56) References Cited

U.S. PATENT DOCUMENTS 5,726,214 A * 3/1998 Buckmaster ............... C08J 9/02
521/103
6,159,631 A * 12/2000 Thompson ........ H01M 10/0431
220/89.2
(Continued)

FOREIGN PATENT DOCUMENTS

FR 2995273 A1 3/2014
JP H10-263099 A 10/1998
(Continued)

OTHER PUBLICATIONS

Dasari et al., Recent developments in the fire retardancy of polymeric materials, Progress in Polymer Science, 38, (2013) 1357-1387 (Year: 2013).*
(Continued)

*Primary Examiner* — Jonathan G Jelsma (57) ABSTRACT

The present invention provides a process for modifying a Li-ion battery having a region of electrochemical activity and an enclosure therefor, said process comprising forming at least one chamber within said enclosure separate from said region of electrochemical activity, positioning combustion abatement agent within said chamber, whereby said combustion abatement agent is not in contact with said region of electrochemical activity, said chamber being pressure or heat sensitive, whereby when said region of electrochemical activity overheats, said chamber is breached, allowing said combustion abatement agent to contact said region of electrochemical activity to abate combustion of said region of electrochemical activity, wherein exemplary of combustion abatement agent is the composition comprising liquid fluoropolyether and exemplary of the of the chamber exhibiting pressure or heat sensitivity is to include a low melting, non-flammable polymer such as polyvinyl alcohol in the material of construction of the chamber.

26 Claims, 5 Drawing Sheets

Related U.S. Application Data (60) Provisional application No. 62/060,749, filed on Oct. 7, 2014, provisional application No. 62/024,117, filed on Jul. 14, 2014.

(51) Int. Cl.
    *H01M 50/30*     (2021.01)
    *H01M 50/342*     (2021.01)
    *H01M 10/058*     (2010.01)
    *H01M 50/35*     (2021.01)
    *H01M 50/103*     (2021.01)
    *H01M 50/143*     (2021.01)
    *H01M 50/119*     (2021.01)
    *H01M 10/0525*     (2010.01)

(52) U.S. Cl.
    CPC ..... *H01M 10/4235* (2013.01); *H01M 50/103* (2021.01); *H01M 50/119* (2021.01); *H01M 50/143* (2021.01); *H01M 50/30* (2021.01); *H01M 50/3425* (2021.01); *H01M 50/35* (2021.01)

(56) References Cited

U.S. PATENT DOCUMENTS

| | | |
|---|---|---|
| 7,563,535 B2 | 7/2009 | Hiratsuka |
| 8,309,240 B1 | 11/2012 | Li et al. |
| 2004/0038126 A1 | 2/2004 | Gu |
| 2006/0275665 A1* | 12/2006 | Hyung ................ H01M 50/375 429/223 |
| 2008/0292950 A1 | 11/2008 | Maeda et al. |
| 2009/0098443 A1 | 4/2009 | Yamamoto et al. |
| 2011/0262783 A1 | 10/2011 | Mehta |
| 2011/0313110 A1* | 12/2011 | Inagaki ................ C09K 21/14 525/146 |
| 2012/0171529 A1 | 7/2012 | Sugita et al. |
| 2012/0258341 A1 | 10/2012 | Ahn |
| 2013/0095353 A1 | 4/2013 | Li et al. |
| 2013/0269958 A1 | 10/2013 | Zhang et al. |
| 2014/0060859 A1 | 3/2014 | Kountz et al. |
| 2014/0065461 A1 | 3/2014 | Kountz et al. |
| 2016/0008649 A1 | 1/2016 | Kountz et al. |
| 2016/0329608 A1* | 11/2016 | Jung ................ H01M 50/271 |

FOREIGN PATENT DOCUMENTS

| | | |
|---|---|---|
| JP | 2007-227171 A | 9/2007 |
| JP | 2014011095 A | 1/2014 |
| KR | 20040105338 A | 12/2004 |
| WO | 2009108374 A1 | 9/2009 |
| WO | 2015184310 A1 | 12/2015 |

OTHER PUBLICATIONS

Haynes et al., "Poly(L-lactic acid) with Segmented Perfluoropolyether Enchainment", Macromolecules, vol. 40, pp. 9354-9360 (2007).

* cited by examiner

LI-ION BATTERY HAVING IMPROVED SAFETY AGAINST COMBUSTION

CROSS-REFERENCES TO RELATED APPLICATIONS

This application is a continuation of U.S. patent application Ser. No. 14/755,160, filed Jun. 30, 2015, which claims the benefit of U.S. Provisional Application No. 62/024,117, filed Jul. 14, 2014, and U.S. Provisional Application 62/060,749, filed Oct. 7, 2014, all of which are incorporated by reference herein in their entirety.

BACKGROUND INFORMATION

Field of the Disclosure

This invention relates to the abatement of combustion of Li-ion batteries.

Description of the Related Art

U.S. Patent Publication 2014/0065461 discloses fluorinated materials for use in abating the combustion of Li-ion batteries. The fluorinated materials disclosed have different identities and different forms (states), i.e. solids and semi-solids. Various placements of the fluorinated material with respect to the Li-ion battery are disclosed, including placements in which multiple fluorinated materials are used. FIGS. 1, 2, 3, 4, and 5*a, b*, and *c* disclose placements outside the can of the battery, and FIG. 6 discloses placement of fluoropolymer film inside the metal foil enclosure of a prismatic type of Li-ion battery. Inside placement has the advantage of providing a combustion abatement effect closer to the source of overheating within the Li-ion battery, which can lead to combustion.

U.S. Patent Publication 2011/0262783 (assigned to Tesla) discloses the coating of the center pin in the region of electrochemical activity of a Li-ion battery in the jelly-roll configuration, the coating being an intumescent material, optionally having an overlayer of non-intumescent material. U.S. Pat. No. 8,309,240 discloses fire-retardant material encapsulated in a material that is electrochemically inert and then mixing the encapsulated spheres with the electrolyte or with the anode layer and/or the cathode layer of the Li-ion battery. Alternatively, fire retardant material is absorbed into the pores of a porous mandrel (center pin) and coated with the encapsulation material. Thus, the encapsulated fire-retardant material is installed in the region of electrochemical activity of the battery. The encapsulation material is disclosed to keep the fire retardant material out of contact with the electrolyte and electrodes until there is overheating which melts the encapsulation material, whereupon the fire-retardant material is released from the encapsulation.

There is a need for additional methods and Li-ion battery constructions that enable the fire retardant to be available inside the battery to abate combustion.

SUMMARY

The present invention provides methods and Li-ion battery constructions for making combustion abatement agent available from inside the battery for abating combustion therein.

According to one embodiment of the present invention, a process is provided, comprising modifying a Li-ion battery having a region of electrochemical activity and an enclosure therefor, said process comprising forming at least one chamber within said enclosure separate from said region of electrochemical activity, positioning combustion abatement agent within said chamber, whereby said combustion abatement agent is not in contact with said region of electrochemical activity, said chamber being pressure and/or heat sensitive, whereby when said region of electrochemical activity overheats, said chamber is breached, allowing said combustion abatement agent to contact said region of electrochemical activity to abate combustion of said region of electrochemical activity. Preferably, said chamber includes a membrane providing the heat and/or pressure sensitivity of said chamber, whereby it is said membrane that is breached upon the overheating of said region of electrochemical activity.

Another embodiment of the present invention is a Li-ion battery comprising an enclosure, structure defining a region of Li-ion electrochemical activity positioned within said enclosure, said structure including oppositely charged electrodes for attracting Li-ions from one said electrode to another said electrode, structure defining at least one chamber positioned within said enclosure separate from said region of Li-ion electrochemical activity, said region of Li-ion electrochemical activity being subject to overheating by short-circuiting occurring within said region of Li-ion electrochemical activity, said chamber containing combustion abatement agent maintained separate from said region of Li-ion electrochemical activity, said structure defining said chamber containing said combustion abatement agent including a membrane that is breachable by said overheating to thereby release said combustion abatement agent into said region of electrochemical activity to abate combustion therewithin. Another aspect of this embodiment is a Li-ion battery comprising an enclosure, structure defining a region of Li-ion electrochemical activity positioned within said enclosure, said structure including oppositely charged electrodes for attracting Li-ions from one said electrode to another said electrode, structure defining at least one chamber positioned within said enclosure separate from said region of Li-ion electrochemical activity, said region of Li-ion electrochemical activity being subject to overheating by short-circuiting occurring within said region of Li-ion electrochemical activity, said chamber containing combustion abatement agent maintained separate from said region of Li-ion electrochemical activity, said structure defining said chamber containing said combustion abatement agent including a membrane that is breachable by said overheating to thereby release said combustion abatement agent into said region of electrochemical activity to abate combustion therewithin, with the proviso that when said membrane comprises combustion abatement agent, the presence of said combustion abatement agent in said chamber is optional. The membrane in each aspect of this embodiment is heat and/or pressure sensitive, enabling it to be breached by overheating within said region of electrochemical activity.

By abatement of combustion or similar expression is meant that the combustion never occurs even though the corruption of the Li-ion battery is such that the run-away exothermic reaction is expected, or if combustion commences, its intensity is reduced or the fire is very quickly extinguished. Reduced intensity means that when a plurality of Li-ion batteries is present within the case of a battery pack, the combustion tends to be limited to just the corrupted battery.

By pressure or heat sensitive is meant that heat and/or pressure causes rupture of the chamber. This meaning also applies to the membrane being breachable by overheating.

In both embodiments mentioned above, the enclosure can comprise (i) metal foil as would be the case when the Li-ion battery is the prismatic type of battery or (ii) a can as would be the case when the region of electrochemical activity of the Li-ion battery is in the jelly-roll configuration. Thus, the enclosure of the battery is that which separates the battery from the environment outside the battery. The enclosure differs from a battery case, which as disclosed in U.S. Patent Publication 2014/0065461 is the container for multiple batteries.

In both embodiments, the separation of the chamber from the region of electrochemical activity is preferably accomplished by the chamber being positioned outside the region of electrochemical activity.

In both embodiments, the combustion abatement agent preferably comprises liquid fluoropolyether. The fluoropolyether may be a mixture with solid material resulting in the formation of a semi-solid. The solid material can be a different combustion abatement agent and/or simply a thickener. The fluoropolyether, whether in the liquid state or as a mixture with solid material that either retains the liquid state or results in the formation of a semi-solid, can contain decomposition catalyst. Thus preferred aspects of the present invention applicable to both the process and Li-ion battery embodiments are as follows:

The combustion abatement agent is a composition comprising liquid fluoropolyether. This composition additionally comprises decomposition catalyst and/or solid material, which are preferably particulate. This solid material is an additional combustion abatement agent, i.e., additional to the liquid fluoropolyether. The composition resulting from this liquid fluoropolyether and this solid material is a semi-solid. The composition comprising the liquid fluoropolyether and decomposition catalyst is in the liquid state under normal conditions. Liquid state under normal conditions and semi-solid (state) are defined hereinafter.

Preferred aspects of the Li-ion battery of the present invention, both process and product embodiments, include the following:

The membrane is breachable by the overheating causing melting of said membrane or rupture of the membrane, such as by bursting from the pressure build up within the region of electrochemical activity.

The chamber containing the combustion abatement agent is positioned between said enclosure and the structure defining the region of Li-ion electrochemical activity.

The enclosure includes a vent for pressure release upon the overheating occurring within the region of Li-ion battery electrochemical activity, and the chamber containing said combustion abatement agent is positioned between the vent and the region of Li-ion electrochemical activity. The vent includes a closure that opens to permit pressure release, the opening of said vent accompanying the rupture of the membrane.

The vent is positioned at one end of said enclosure and an additional chamber including a membrane that is breachable by the overheating and containing combustion abatement agent is positioned remote from the chamber positioned between the vent and the region of Li-ion electrochemical activity, whereby the combustion abatement agent from each of the chambers is released into said region of Li-ion electrochemical activity upon the overheating to thereby abate combustion within the region of Li-ion electrochemical activity.

DETAILED DESCRIPTION OF THE INVENTION

Figure 1:
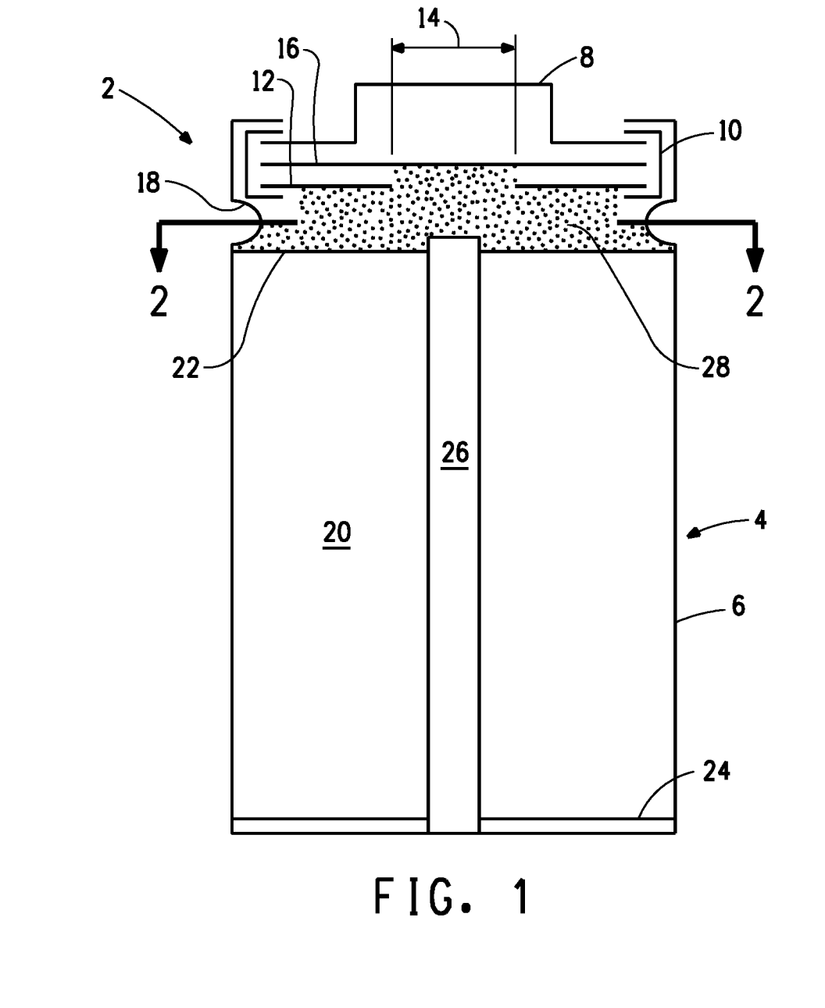
FIG. 1 is schematic side cross-sectional view of a Li-ion battery, illustrating one embodiment of a chamber positioned within the enclosure of a battery, separate from the region of electrochemical activity, and containing combustion abatement agent.

In FIG. 1, a Li-ion battery, within which Li-ion electrochemical activity occurs, comprises an enclosure 4, which in turn comprises a can 6 and a battery top 8, which is the positive pole of the battery. The can 6 is the negative pole of the battery. The two poles are insulated from one another by a u-shaped insulator ring 10 positioned between the positive and negative poles where proximate to one another. Positioned within the u-shape of the insulator ring 10 is a disc 12 having an aperture 14 therewithin and a rupture disc 16 forming a closure of aperture 14. The elements 8, 12, and 16 are shown spaced from one another for clarity. In practice these elements are pressed together, either directly or through the presence of shims (not shown) by the crimp 18 encircling the can 6 as shown.

The sides of the can 6 and sheet insulators 22 and 24 define the structure that forms the enclosure of the region of electrochemical activity. The region of electrochemical activity 20 comprises an electrode assembly, including oppositely charged electrodes for attracting Li ions to pass from one of these electrodes to another of these electrodes through a separator containing electrolyte. This electrode assemblage is rolled up like a jelly-roll about a center pin 26, which is hollow as shown. This is the structure defining the region of electrochemical activity 20, except the lengths of the center pin 26 extending above and below insulators 22 and 24, respectively, are outside the region of electrochemical activity 20. The electrodes of the jelly-roll assemblage are appropriately connected to the can and battery top to provide for their positive and negative polarity. Typically, an insulating sheet (not shown) is positioned between the can 6 and region of electrochemical activity 20. For simplicity, the details of the region of electrochemical activity are not shown in FIG. 1 (and FIGS. 3 and 6). This electrode assembly has the appearance and constituency of the layers 58-66 of the battery 55 of FIG. 7, but rolled up upon itself (jelly roll).

The combination of the structure comprising the enclosure 4 (can 6 and battery top 8), the insulator ring 10, the rupture disc 16 and the top insulator 22 of battery 2 is the structure defining a chamber 28 that is separate from the region of electrochemical activity 20 which is subject to overheating by short-circuiting. Combustion abatement agent is positioned and contained within this chamber and is represented in FIG. 1 and the remaining Figures by stippling. The chamber 28 is positioned between the enclosure of the battery, in particular, the can 6 and battery top 8, and the region of electrochemical activity 20 and overlies and is coextensive with a substantial portion of the region of electrochemical activity 20. Preferably, the hollow interior of the center pin 26 does not contain combustion abatement agent. The hollow center pin 26 may be plugged to prevent entry of the combustion abatement agent into the interior of the center pin if desired. This entry can be prevented by controlling the height of the combustion abatement agent in the chamber 28 to be less than the height of the center pine 26 extending into the chamber 28. The top insulator 22 serves as a pressure and/or heat sensitive membrane of the chamber 28. The rupture disc 16 is preferably primarily pressure sensitive. The top insulator 22 forming the underside of the chamber 28 keeps the combustion abatement agent out of contact with and therefore separate from the region of electrochemical activity until the region of electrochemical activity overheats, causing the breaching of top insulator 22, thereby allowing the combustion abatement agent to contact the region of electrochemical activity to abate combustion.

Because the center pin 26 is surrounded by the electrode assembly, it is within the region of electrochemical activity, whereby the center pin, both its outside surface and its hollow interior, are not separate from the region of electrochemical activity 20. The chambers within which combustion abatement agent is positioned according to the present invention are substantially separate from the center pin. Thus, the small extension of the center pin 26 into chamber 28 in FIG. 1 is not essential to the combustion abatement effect achieved by release of the combustion abatement agent from chamber 28 onto the electrode assemblage within the region of electrochemical activity 20. Moreover this small extension of the center pin 26 into chamber 28 is outside the region of electrochemical activity 20.

In operation, when the Li-ion battery is corrupted within the region of electrochemical activity, this region overheats and this overheating is accompanied by an increase in pressure. This overheating and increase in pressure, individually or in combination, causes breaching of the top insulator 22. This breaching releases the combustion abatement agent from chamber 28 into the region of electrochemical activity 20, enabling the agent to abate this combustion. The pressure developed within the region of electrochemical activity may be sufficient to cause rupture of rupture disc 16, whereby the aperture 14 covered by the rupture disc serves as a vent for pressure release from the battery. The volatile gas accompanying this rise in pressure cause by overheating occurring within the region of electrochemical activity is allowed to escape from the battery by an aperture (not shown) in the battery top 8.

The positioning of the chamber 28 between the region of electrochemical activity 20 and the vent (aperture 14) has the effect of coupling pressure release from inside the battery with release of combustion abatement agent into the region of electrochemical activity to abate combustion.

Figure 2:
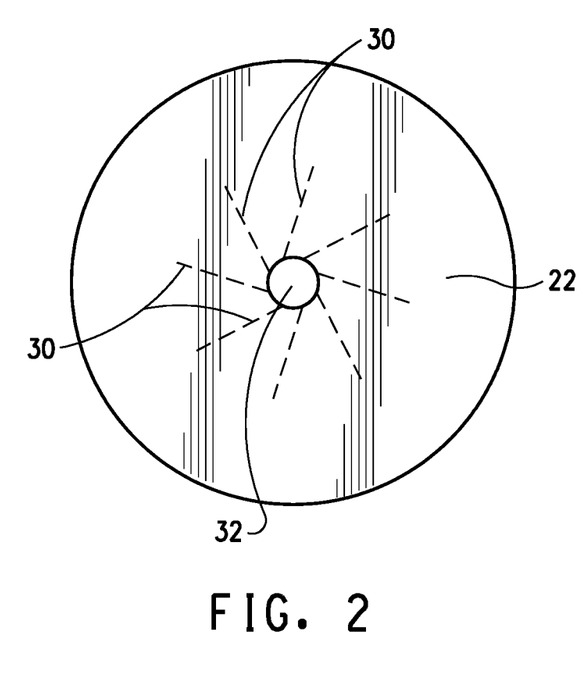
FIG. 2 is a cross-sectional view along line 2-2 of one embodiment of the breachable portion of the chamber of FIG. 1.

To aid in the breaching of top insulator 22, the insulator 22 is scored with an array of lines 30 extending away from the aperture 32 through which the center pin 26 fits as depicted in FIG. 2. This scoring weakens the insulator 22, thereby promoting its breach in response to the heat/pressure occurring from corruption of the battery within the region of electrochemical activity.

Depending upon the magnitude of the overheating and pressure build-up within the region of electrochemical activity, the rupture disc 16 can also burst to permit escape of volatiles from the region of electrochemical activity through chamber 28. The presence of the rupture disc 16 is optional, since the top insulator 22 acts to release pressure developed within the region of electrochemical activity. If the rupture disc were not present, the aperture 14 would serve to relieve battery internal pressure. The presence of the rupture disc 16, however, serves to protect the chamber 28 from entry of impurities during storage, handling, and use. The combustion abatement agent can be loaded into the chamber 28 prior to installation of the rupture disc 16, if any.

The rupture disc 16 can also be scored to assist in its rupture. Alternatively, one or both the top insulator 22 and rupture disc 16 can be of low melting material, whereby the overheating within the region of electrochemical activity is sufficient for the top insulator or rupture disc, as the case may be, to melt. The melting of the top insulator 22 will release the combustion abatement agent onto the region of electrochemical activity, and the melting of the rupture disc 16 will allow volatiles to escape from the battery. This escape will of course be moderated and rendered unnecessary by the combustion abatement agent from the chamber 28 abating combustion within the region of electrochemical activity 20. The melting of the top insulator 22 also facilitates its rupture under the pressure increase within the region of electrochemical activity upon corruption of the battery.

An example of a material of construction from which the sheet of top insulator 22 and the rupture disc 16 can be made is a hydrocarbon polymer such as polyvinyl alcohol, which is a low melting polymer, melting temperature of 180° C. to 190° C., having the property of being electrically insulating and subject to charring upon heating above the melting temperature. Another example of a material from which the sheet of top insulator and the rupture disc can be made is polyvinylidene fluoride, a low melting polymer, melting temperature as low as 170° C., which is flame resistant and does not support combustion. Lower melting electrically insulating polymers can be used are the hydrocarbon polymers such as polyethylene or polypropylene, which melt at temperatures above 100° C. Higher melting hydrocarbon polymer, such as polyamide, can be used, wherein pressure sensitivity achieved by scoring, will be the primary mechanism for breaching of the insulator 22 or rupture disc 16. Preferably the hydrocarbon polymers just mentioned are flame retardant, i.e. contain one or more flame retardants effective to impart non-flammability to the polymer. Examples of flame retardants include those containing bromine, such as decabromodiphenyl ether, those containing phosphorus such as dimethyl methylphosphonate, and mineral such as aluminum trihydrate. Preferably, the material of construction of the top insulator 22 and rupture disc 16 has a melting temperature of at least 100° C. Preferably, the melting temperature is no greater than 350° C., more preferably no greater than 200° C. Preferably, the material of construction at least of the top insulator 22 is inert with respect to the Li-ion electrochemical activity occurring within the region of electrochemical activity in its normal operation and is electrically insulating. Alternatively, the rupture disc can be metal that is either scored or has pressure sensitive attachment bridging the aperture 14.

Figure 3:
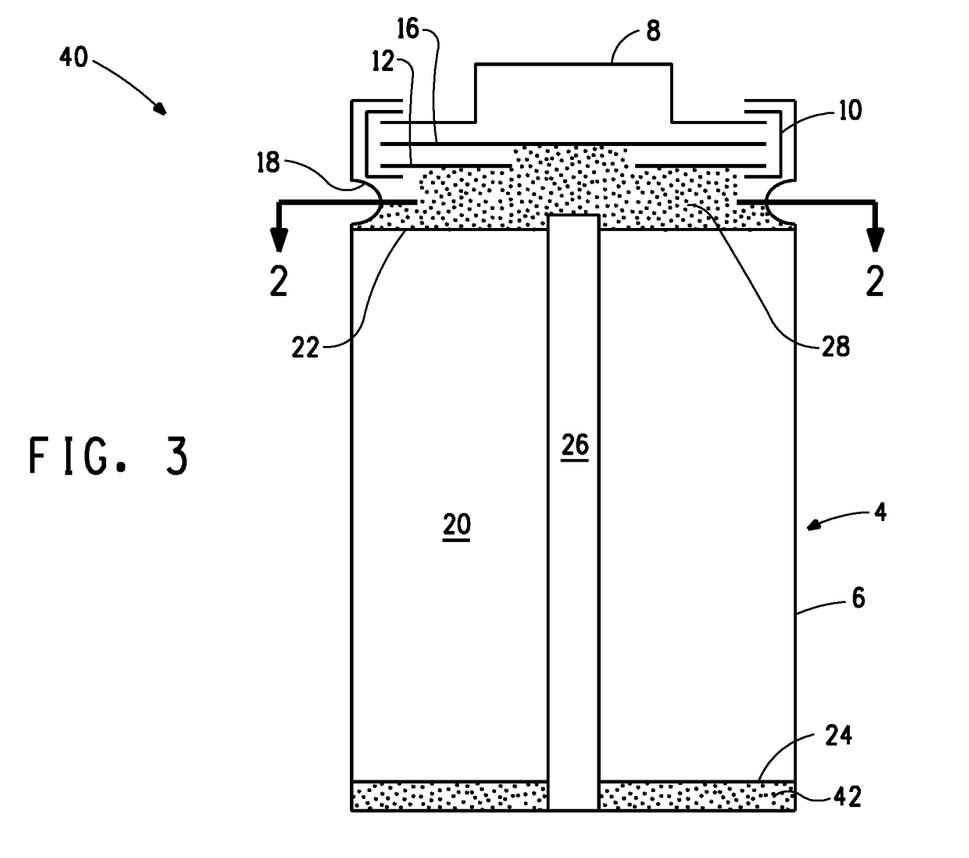
FIG. 3 is a schematic side cross-sectional view of a Li-ion battery illustrating another embodiment of a chamber positioned the enclosure of the Li-ion battery, separate from the region of electrochemical activity, and containing combustion abatement agent.

The elements numbered the same as FIG. 1 in the remaining Figures are the same as in FIG. 1. In FIG. 3 the battery of FIG. 1 is modified to battery 40 having a second chamber 42 within the enclosure 4 at the bottom of the battery and defined by the bottom of the can 6 and the bottom insulator 24 being spaced, such as by shimming (not shown) from the bottom of the can. The second chamber 42 is in effect positioned within the enclosure 4 for the battery, e.g. at one end, that is remote from the aperture 14 defining the battery vent and the chamber 28, e.g. at the opposite end of the battery. The combustion abatement agent can be loaded into chamber 42 prior to installation of the region of electrochemical activity 20 into the can 6. The chamber 42 can be present in the battery 2 in combination with chamber 28 or in place thereof, i.e. no chamber 28. When combustion abatement agent is positioned in both chambers 28 and 42, the effect of volatiles heading to the top chamber 28 and aperture 14 draws combustion abatement agent from the bottom chamber 42 into the region of electrochemical activity 20, resulting in release of combustion abatement agent from both chambers into the region of electrochemical activity. This abates combustion within this region. The bottom insulator 24 can be scored similar to that of the top insulator 22 as shown in FIG. 2, and can be the same or different from the material of construction as the top insulator 22 to serve as the heat and/or pressure sensitive membrane of chamber 42. The chamber 42 is coextensive with a substantial portion of the region of electrochemical activity 20. As depicted in FIGS. 1 and 3, the chambers 28 and 42 are coextensive with the top and bottom, i.e. opposite ends, of the region of electrochemical activity 20.

Figures 4, 5:
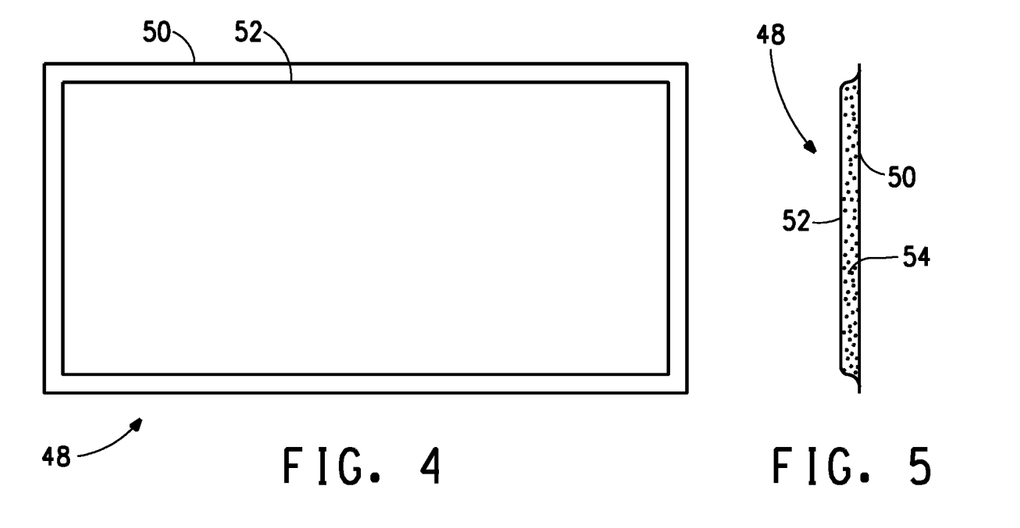
FIG. 4 is a schematic plan view of one embodiment for the construction of a chamber containing combustion abatement agent.
FIG. 5 is a schematic cross-sectional end view of the chamber of FIG. 4.

FIG. 4 is directed to a different embodiment for providing the chamber separate from the region of electrochemical activity and being within the enclosure 4 of the battery. In FIG. 4, multilayer sheet 48 is shown comprising a bottom film 50 and a top film 52 spaced from the bottom film to form a chamber 54 filled with combustion abatement agent as best shown in FIG. 5. To form this chamber, the combustion abatement agent can be applied as a uniform layer to bottom film 50, keeping the side borders of the film 50 clean (uncovered). The top film 52 can then be placed on top of the layer of agent, followed by heat sealing overlying side borders of each film together. The heat sealed borders will be thinner than the separated film layers forming the chamber 54. If desired, strips (not shown) of the same polymer as the films 50 and 52 can be heat sealed (bonded) to the border lengths to bring the thickness of the border area to be the same as the chamber area. Instead of heat sealing, the overlapping borders of films 50 and 52 and strips of film can be adhered together by an adhesive. The material of construction of films 50 and 52 can be the same as form top insulator 22. Thus, the films 50 and 52 are membranes that are breachable by overheating within the region of electrochemical activity to release the combustion abatement agent into the region of electrochemical activity 20.

Figure 6:
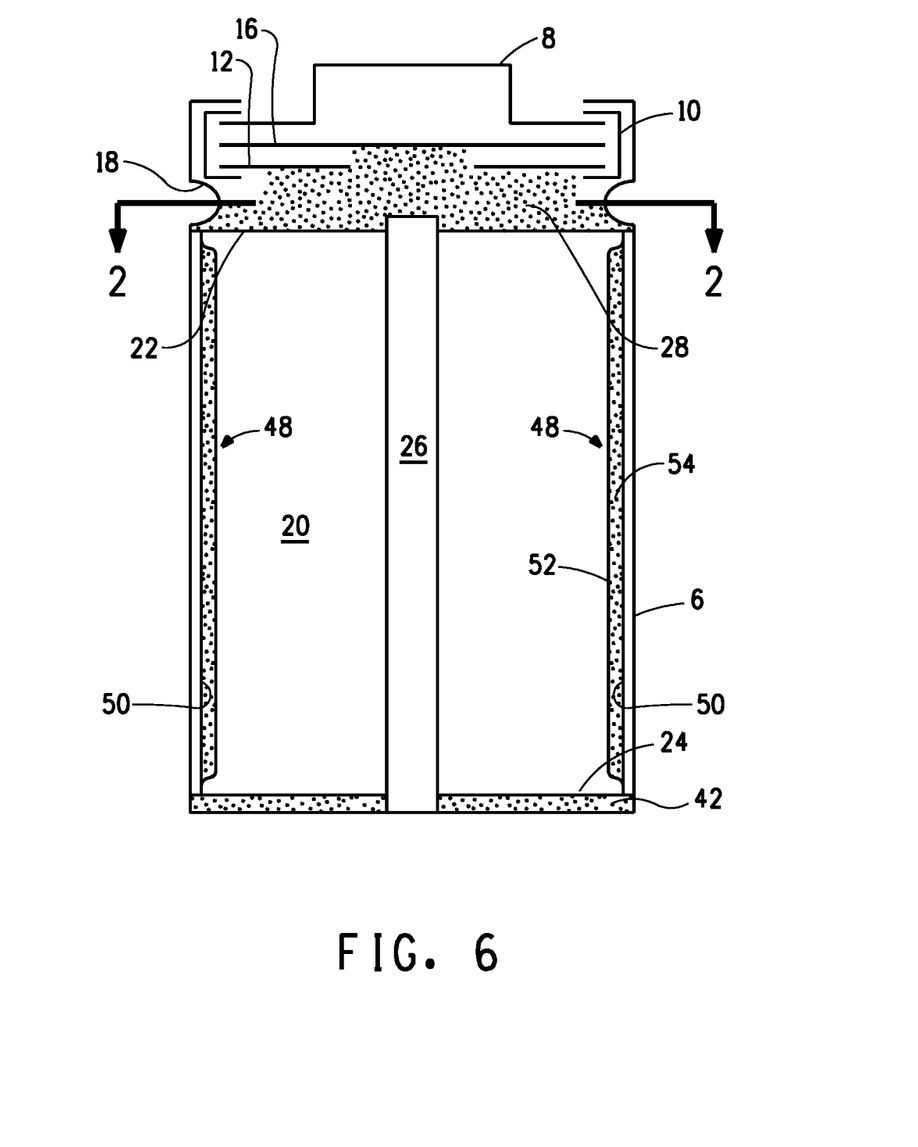
FIG. 6 is a schematic side cross-sectional view of a li-ion battery with the chamber of FIGS. 4 and 5 being positioned inside the enclosure of the battery separate from the region of electrochemical activity.

In FIG. 6, the multilayer sheet 48 is positioned inside the Li-ion battery between the can 6 and the outer surface of the jelly roll assemblage forming the region of electrochemical activity 20. As with the chambers 28 and 42, the chamber 54 is positioned within the battery enclosure 4, but outside the region of electrochemical activity 20 and is coextensive with a substantial portion of the region of electrochemical activity 20. This provides a cylindrical sheath of combustion abatement agent surrounding the side of the region of electrochemical activity 20. As shown in FIG. 6, this embodiment can be combined with the embodiments of FIGS. 1 and 3, which position the combustion abatement agent at top and bottom of the region of electrochemical activity 20, thereby surrounding the region of electrochemical activity with chambers containing combustion abatement agent. Alternatively, the chamber 54 can be combined with only one of, or none of, the chambers 28 and 42. The film 50 facing the region of electrochemical activity is the heat and/or pressure sensitive membrane for chamber 54 and can be scored (not shown) to assist in its breaching in response to overheating within the region of electrochemical activity 20.

The structure defining the chambers, such as chambers 28, 42, and 54, defines an empty space or void that contains combustion abatement agent that is different from the defining structure. The defining structure itself can include combustion abatement agent, which is nevertheless different from the combustion abatement agent contained in the chamber.

Figure 7:
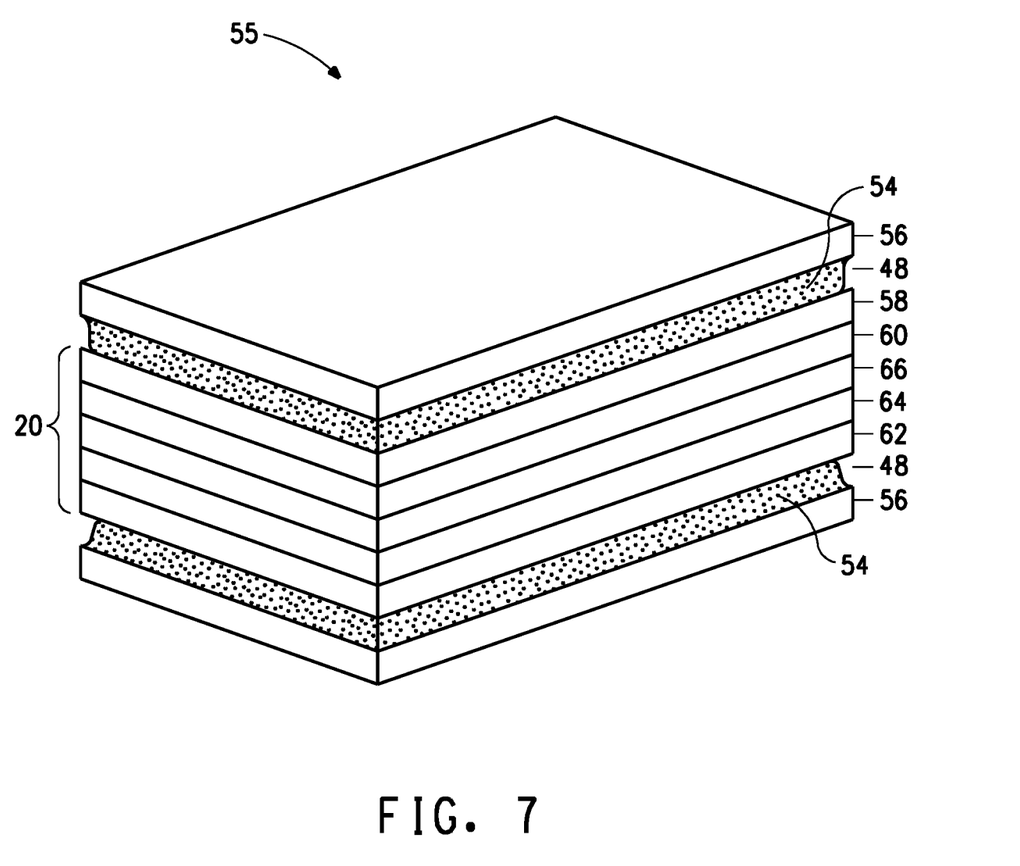
FIG. 7 is a schematic isometric view of the layers of material present in a prismatic Li-ion battery and including chambers separate from the region of electrochemical activity and containing combustion abatement agent.

FIG. 7 shows another embodiment of the present invention wherein the battery is the prismatic battery 55 made up of a stack of layers of materials, as follows:

metal foil 56 forming the top and bottom layers of the battery 55, multilayer sheet 48 each forming a chamber 54 filled with combustion abatement agent adjacent each metal foil layer, anode current collector layer 58 adjacent to one of the layers 48, ionically active layer 60 adjacent to anode current collector layer 58, cathode current collector layer 62 adjacent to the other multilayer sheet 48, ionically active layer 64 adjacent to the cathode current collector layer 62, and porous separator layer 66 positioned between the layers 60 and 64.

For simplicity, the metal foil layers 56 are not shown enveloping the sides of the other layers to form the enclosure (pouch) of the battery 55, and tabs of the anode and cathode current collectors are not shown extending through the pouch for electrical connectivity.

The metal foil layers 56 are preferably of aluminum and are preferably coated (not shown) on both surfaces (top and bottom) with polymer for electrical insulation purposes. Further mention of the metal foil layer includes the preference for these polymer coatings being present on the metal foil of the metal foil layer. The polymer coating on the surface of the metal foil layer 56 facing the outside of the of the battery is preferably polyamide and the polymer coating of the surface of the metal foil layer facing the inside of the battery is preferably polypropylene. The anode current collector layer 58 is preferably copper, and the cathode current collector 62 is preferably aluminum. The multilayer film 48 can be in contact with their respective current collector layers 58 and 62. The multilayer film 48 can also be in contact with their respective metal foil layers 56. The multilayer film 48 can be separate from, i.e. not bonded to, the adjacent metal foil layer and/or the adjacent current collector layer. As an aid to understanding FIG. 7, i.e. to distinguish layer formed from multilayer film 48 from the other layers depicted in FIG. 7, the multilayer film 48 is depicted in FIG. 7 as containing combustion abatement agent in its respective chamber 54. The ionically active layers 60 and 64 are preferably coatings on their respective current collector layers 58 and 62. An example of the layer 60 is lithiated graphite and binder, and an example of the layer 64 is lithiated metal oxide and binder. The combination of layers 58 with 60 and 62 with 64 form the electrodes of the battery. The porous separator layer 66 is a porous material containing electrolyte, the pores permitting the passage of lithium ions during discharge. The porous material separator may be polymeric, wherein the polymer is by itself hydrophilic or has a hydrophilic coating on the surfaces of the separator, including its pores. Overheating within the region of electrochemical activity 20, results in melting and/or rupturing (by bursting) of the films making up multilayer film 48, thereby releasing combustion abatement agent to abate combustion of the battery. The layers 58-66 represent the region of electrochemical activity 20 within the enclosure formed by layers 56 of the battery 55. The layers 48 containing the combustion abatement agent are positioned within this enclosure but outside the region of electrochemical activity 20, the boundaries of which as defined by layers 58 and 62. Thus, during normal operation of the battery, the combustion abatement agent is kept separate from the region of electrochemical activity.

Identification of the insulator 22 and insulator 25 (FIGS. 1 and 3) as top and bottom insulators, respectively, and to the multilayer sheet 48 being present adjacent to the top layer and bottom layers of the prismatic battery of FIG. 7 is with reference to the orientation of the batteries depicted in these drawings. For both this orientation and different battery orientations, the top and bottom locations can be identified as being one end of the battery and the opposite end of the battery, respectively. Once the ends of the battery are identified, then the remaining location for positioning a chamber containing combustion abatement agent can be identified as the side(s) of the battery.

In addition to chambers such as chambers 28, 42, and 54 described above, the Li-ion battery can be equipped with other safety features such a circuit interrupter.

The coextensivity of the chambers 28, 42, and 54 with substantial portions of the region of electrochemical activity 20 include coextensivity with substantial portions of the opposing surfaces of the region of electrochemical activity. Preferably, the heat and/or pressure sensitive membranes included in the structure defining each chamber is in contact with the outer surface of the region of electrochemical activity 20 and is preferably electrochemically inert, i.e. does not adversely affect the normal electrochemical activity of the region of electrochemical activity in its normal operation. Preferably, the Li-ion battery to which the embodiments of the present invention are applicable is a secondary battery, i.e. is rechargeable. These embodiments are also applicable to primary Li-ion batteries.

Figure 8:
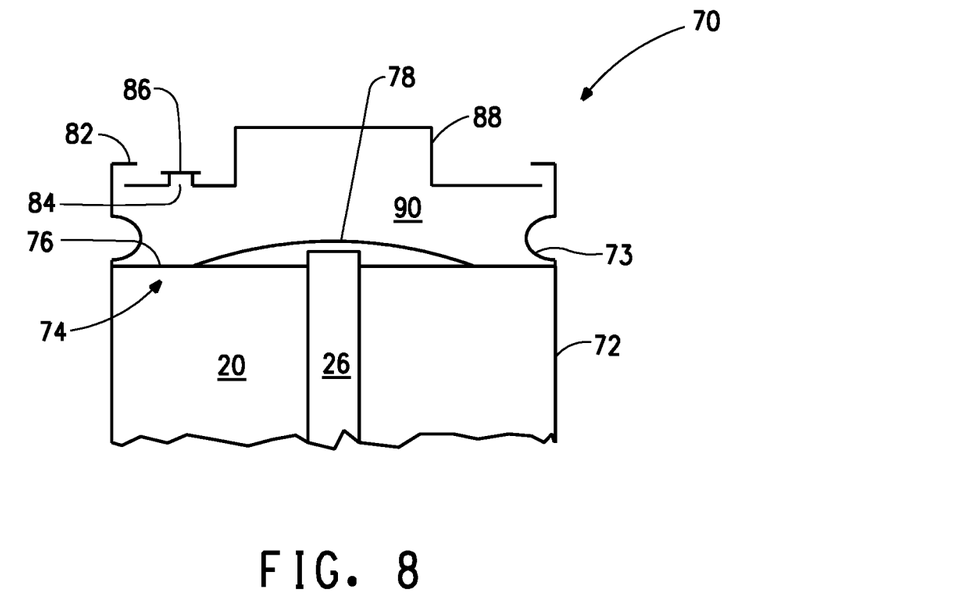
FIG. 8 is a schematic cross-sectional view of the upper portion of the Li-ion battery of FIG. 1 modified to illustrate another embodiment of the present invention.
Figure 9:
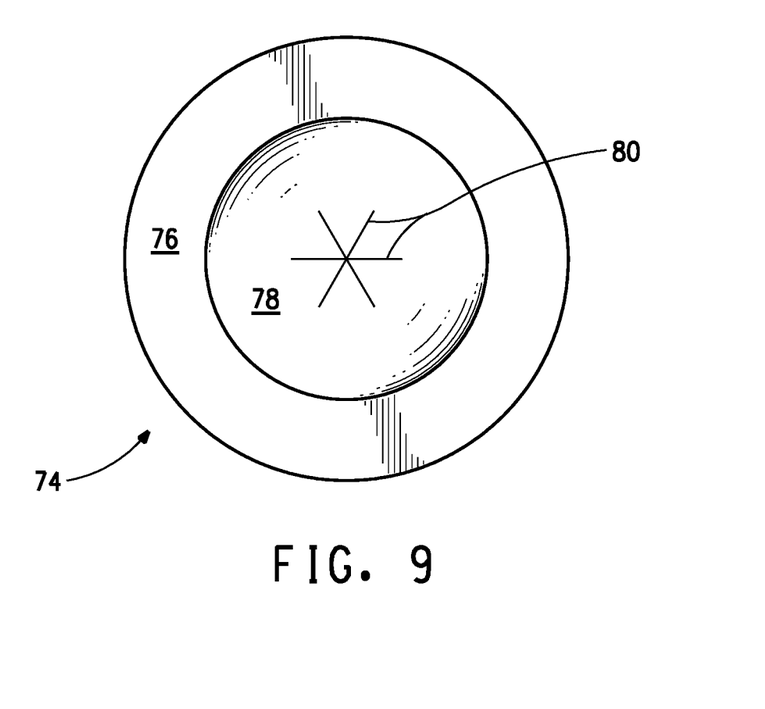
FIG. 9 is a plan view of the membrane depicted in FIG. 8.

The Li-ion battery 70 of FIG. 8 incorporates these principles. The battery 70 comprises a can 72, within which is contained a region of electrochemical activity 20 surrounding center pin 26. Top insulator 74 is positioned on top of the region of electrochemical activity 20 and is clamped thereto by crimp 73 in the side of can 72. The top insulator 74 has a flat periphery 76 and a domed central portion 78. The top insulator is annular in shape as best depicted in FIG. 9, and domed central portion 78 has score lines 80 to facilitate its rupture upon exposure to heat and pressure from region of electrochemical activity 20 when corrupted.

The battery also has a battery top 88 serving as the positive pole of the battery. Top 88 is held in place by clamping between crimp 73 and flange 82. The top 88 contains a vent 84 in the form of a cylindrical opening in the top bounded by a short stack. A pressure release closure 86 is provided for the opening in the top of the short stack and is secured to the short stack of the vent 84 or top 88 by conventional means (not shown).

The top insulator 74 or at least the domed central portion 78 is preferably made of combustible abatement agent, such as thermally destabilizable fluoropolymer, examples of which are described hereinafter and which are capable of being fabricated into the top insulator structure. This serves as the membrane that is breachable by overheating within the region of electrochemical activity 20. This overheating is accompanied by the development of pressure within the region of electrochemical activity, arising from the corruption within this region, characteristic of the battery embodiments of FIGS. 1, 3, 6, and 7. This results in the breaching of top insulator, by rupture along the score lines 80. In the embodiment of FIG. 8, rupture along score lines does more than release the pressure build-up within the region of electrochemical activity 20. Since the combustion abatement agent such as thermally destabilizable fluoropolymer from which the top insulator 74 or at least the domed central portion 78 is made reacts to deplete volatile combustibles under the conditions of corruption to contribute to or accomplish combustion abatement. The resultant volatiles exiting the battery via top 88 through vent 84, upon pressure-assisted removal of closure 86, are noncombustible. Further contributing to combustion abatement is the melting of the combustion abatement agent such as the thermally destabilizable fluoropolymer, resulting in molten agent entering the region of electrochemical activity 20 to provide combustion abatement.

In one embodiment, the thickness of the top insulator 74 or at least the domed central portion 78 provides enough combustion abatement agent such as thermally destabilizable fluoropolymer to accomplish the combustion abatement. The score lines 80 are deep enough into this thickness, to enable breaching in response to the overheating with the region of electrochemical activity 20.

In another embodiment, the empty chamber 90 within the battery 70, which is formed (defined) by top insulator 74, the battery top 88, and the crimp 73 in the battery can 72, contains combustion abatement agent (not shown in FIG. 8). The combustion abatement agent can be added to the chamber 90 prior to application of the battery top 88 to the battery. The amount of combustion abatement agent added to the chamber 90 can range from providing a layer on top of the top insulator 74 to filling up the chamber 90 to the extent possible in the process of assembling the top 88 with the battery can 72. The combustion abatement agent present in chamber 90, but not shown in FIG. 8, at least supplements the combustion abatement effect of the top insulator 74.

The chamber 90 in FIG. 8 is similar to chamber 28 in the batteries of FIGS. 1 and 6, one difference being the presence of rupture disc 16 in chamber 28 in the batteries of FIGS. 1, 3 and 6, but not in the battery of FIG. 8. As is apparent from the construction defining the chamber 90, the rupture disc 16 can be eliminated from the structure defining chamber 28, resulting in volatiles passing directly from chamber 28 to and through the vent (not shown) in the battery top 8 of FIGS. 1, 3, and 6. Alternatively, the rupture disc 16 can be incorporated into the construction of the battery 70 in FIG. 8, thereby becoming the top of the chamber 90.

The thermally destabilizable fluoropolymer as a combustion abatement agent itself is another material of construction from which the bottom insulator 24 (FIGS. 1, 3, and 6) and the films 50 and 52 (FIG. 5) can be made.

The option of chamber 90 in FIG. 8 being empty, i.e. free of combustion abatement agent, can be applied to the chambers 28 and 42 at the top and bottom, respectively, of the battery (FIGS. 1, 3, and 6) when their respective insulators comprise combustion abatement agent such as thermally destabilizable fluoropolymer to provide the combustion abatement effect. The insulators 22 and 24 constitute the overheating breachable membranes of their respective chambers. Thus, when any of these membranes comprise combustion abatement agent such as thermally destabilizable fluoropolymer, the presence of combustion abatement agent in the chamber is optional. It is preferred, however, that the chambers at the top and/or bottom of the battery contain combustion abatement agent. Combustion abatement agent is present in chamber 54 of the embodiment of FIGS. 4 and 5.

The design of the top insulator 74 having a domed central portion 78, which as shown in FIG. 8 covers the end of the center pin 26, can be used in other battery embodiments of the present invention, such as substitution for top insulator 22 in the batteries of FIGS. 1, 3, and 6. The use of this design is not limited to the material of construction being thermally destabilizable fluoropolymer. The material of construction can be any of the materials described above as the material of construction for top insulator 22. The combustion abatement agent is of course itself non-combustible.

The combustion abatement agent can be a single material or a mixture of materials that provide the combustion abatement effect on the corrupted Li-ion battery. Such material(s) can exhibit one or more modes of action in providing the combustion abatement effect, such modes of action including (i) heat absorption, (ii) dilution of combustibles, (iii) becoming intumescent, (iv) forming char, and/or (v) depletion of combustibles. The combustion abatement agent is capable of responding to the corruption of the Li-ion battery with multiple modes of action.

Concerning mode of action (i), agents that absorb heat contribute to the abatement of combustion by removing heat from the potential or actual combustion site within the Li-ion battery. Heat drives the combustion reaction. Removal of this heat abates the combustion. Concerning (ii), dilution of combustibles retards the combustion reactions by barring the combination of combustible species such as oxygen and hydrogen that would otherwise support the combustion process. Concerning (iii) and (iv), these are related in that the charring effect may be the result of intumescence exhibited by the combustion abatement agent when sufficiently heated. Intumescence, however, can be obtained without charring. In either case, preventing its spread or choking off the entry of outside oxygen (air) into the combustion zone. Thus, the char and intumescent structure forms a barrier to combustion. Concerning (v), the non-combustible volatiles emitted by the combustion abatement agent combine with combustible active species such as oxygen and hydrogen to render them non-combustible.

In one embodiment, a preferred combustion abatement agent is to fluoropolyether, which is a liquid under normal conditions (15° C. to 25° C.) and preferably under normal operation of the Li-ion battery (temperatures up to 80° C.) at one atmosphere of pressure. This liquid state means that the fluoropolyether does not emit volatiles during the temperatures up to 40° C., sometimes up to 50° C., or up to 60° C. and even up to 80° C. (one atmosphere pressure). The boiling temperature of the fluoropolyether is preferably at least 80° C., more preferably at least 100° C. and more often at least 150° C. (one atmosphere pressure).

The liquid state arises from the fluoropolyether having a low molecular weight relative to the molecular weight of solid fluoropolymer. Solid fluoropolymer will generally have a molecular weight of at least 50,000, while fluoropolyether will generally have a molecular weight in the range of 800 to 15,000 or 1,200 to 15,000. The preferred fluoropolyether (FPE) is the perfluoropolyether (PFPE). Any mention of fluoropolyethers (FPEs) herein includes perfluoropolyethers (PFPEs). The fluoropolyether is a mixture of different molecular weights. In the PFPE, all monovalent substituents on chain carbon atoms are fluorine. The FPE is characterized by having a chain structure in which oxygen atoms in the backbone of the molecule are separated by saturated fluorocarbon groups having 1-3 carbon atoms, preferably perfluorocarbon groups as in the case of the PFPE. More than one type of fluorocarbon group may be present in the FPE molecule. Representative structures are

$$(\text{—CFCF}_3\text{—CF}_2\text{—O—})_n \qquad (I)$$

$$(\text{—CF}_2\text{—CF}_2\text{—CF}_2\text{—O—})_n \qquad (II)$$

$$(\text{—CF}_2\text{—CF}_2\text{—O—})_n\text{—}(\text{—CF2-O—})_m \qquad (III)$$

$$(\text{—CF}_2\text{—CFCF}_3\text{—O—})_n\text{—}(\text{—CF}_2\text{—O—})_m \qquad (IV)$$

These structures are discussed by Kasai in J. Appl. Polymer Sci. 57, 797 (1995) and they are commercially available as certain KRYTOX® and FOMBLIN® lubricating oils. Preferably, the FPE has a carboxyl group at one end or at both ends of the chain structure of the FPE. For monocarboxyl FPE, the other end of the molecule is usually perfluorinated to as in the case of PFPE but may contain a hydrogen atom. FPE, whether having a carboxyl group at one or both ends, have at least 2 ether oxygens, more preferably at least 4 ether oxygens, and even more preferably at least 6 ether oxygens, i.e. n in the formulae above is at least 2, 4, or 6 and m in the formulae above is at least 1, 2 or 3. Preferably, at least one of the fluorocarbon groups separating ether oxygens, and more preferably at least two of such fluorocarbon groups, has 2 or 3 carbon atoms. Even more preferably, at least 50% of the fluorocarbon groups separating ether oxygens have 2 or 3 carbon atoms. Also, preferably, the FPE has a total of at least 9 carbon atoms. The maximum value of n and m in the formulae above is preferably that which does not exceed the molecular weight at which the composition is liquid under normal conditions and preferably under normal operation of the Li-ion battery. While more than one FPE including can be used in the semi-solid composition of the present invention, preferably only one such FPE. The FPE is a mixture of different molecular weights, a composition, wherein the n or m value given is the average number of n and m groups present in the FPE.

The FPE and especially the PFPE have high thermal stability. When thermally unstable end groups, such as carboxyl, are present in the FPE, the heat provided by the corrupted Li-ion battery, causes the decarboxylation of the FPE (and PFPE). This decarboxylation contributes nonflammable volatiles to abate combustion. The overheating of the corrupted battery can also cause the fluoropolyether to decompose, thereby emitting non-combustible volatiles that combine with combustible active species such as oxygen and hydrogen to render them non-combustible (mode of action (v)). The liquid fluoropolyether can exhibit the additional combustion abatement effect of preventing combustion from occurring when present at the combustion site before combustion begins.

The thermal stability of the liquid fluoropolyether can be reduced by incorporating decomposition catalyst into the fluoropolyether. The decomposition catalyst operates thermally, i.e. in response to heating of the fluoropolyether as occurs upon corruption of the Li-ion battery. The decomposition catalyst lowers the temperature of decomposition of the fluoropolyether, resulting in earlier emission of non-combustible volatiles that abate combustion of the Li-ion battery. The preferred decomposition catalyst is Lewis acid, such as $AlCl_3$, $BF_3$, $FeCl_3$ and $TiCl_4$. Preferably these are particulate solids under normal operating conditions of the Li-ion battery. Only a small amount of catalyst is necessary to be effective in causing decomposition of the fluoropolyether upon its heating by the corrupted Li-ion battery. For example, the amount of catalyst, such as Lewis acid, present in the fluoropolyether is 0.1 to 2 wt % based on the weight of the fluoropolyether.

In another embodiment, the combustion abatement agent can be a solid, typically in the particulate form, under the operating conditions of the Li-ion battery, and typically an inorganic compound.

Examples of combustion abatement agents include those compounds that, upon thermally-induced decomposition, emit water, nitrogen, nitrogen dioxide, carbon dioxide, or sulfur dioxide, which contribute to modes of action (i) and (ii). Examples of these compounds include hydrate, carbonate, bicarbonate, sulfate, bisulfite and bisulfate. Specific compounds include $Al(OH)_3$, sometimes represented as $Al_2O_3 \cdot 3H_2O$, $Mg(OH)_2$, borax ($Na_2B_2O_7 \cdot 10H_2O$), Zn borate, and sepiolite, a mineral that is hydrated magnesium silicate. The release of water from hydrates is considered decomposition. $Al(OH)_3$, for example releases water upon heating to about 180° C.

Additional compounds that are combustion abatement agents include the alkali and alkaline earth metal carbonates, bicarbonates, sulfates, bisulfites, and bisulfates, such as sodium, potassium, calcium and magnesium carbonate, bicarbonate, sulfate, bisulfite and bisulfate. Examples of nitrogen or nitrogen dioxide emitting compound include melamine and melamine cyanurate.

The combustion abatement agent can become a char and/or exhibit intumescence upon heating (modes (iii) and (iv)), such agents including sodium silicate, vermiculite and graphite. Except for graphite, these compounds are preferably inorganic. The combustion abatement agent can be a heat absorbing solid such as carbon. Carbon can be considered simply as a single element compound as distinguished from the inorganic compounds mentioned above.

The combustion abatement agent can be phosphorus containing, and preferably inorganic, such as ammonium polyphosphate ($[NH_4PO_4]_x$), alkali metal or alkaline earth metal orthophosphate or pyrophosphate, which contribute combustion abatement through mode of action (v). The combustion abatement agent can be an organic compound such as one that is bromine containing, examples of which are organic bromine-containing compounds such as carbon tetrabromide, tetrabromo-bisphenol A and tris(tribromoneopentyl) phosphate.

From the foregoing, it is apparent the combustion abatement agents that are inorganic compounds, carbon, or organic compounds and preferably non-polymeric. These are combustion abatement agents other than fluoropolymers that are thermally destabilized as described below.

In another embodiment, the combustion abatement agent is a solid fluoropolymer which is non-flammable and decomposes under overheating by the corrupted Li-ion battery to emit volatile species that abate the combustion. Preferably, the solid fluoropolymer is thermally destabilizable so as to provide this decomposition in response to corruption of the Li-ion battery. This fluoropolymer can have a wide variety of identities to be described hereinafter, all of which are in the solid state. In general, the fluoropolymer has a carbon atom backbone as the polymer chain: e.g., —C—C—C—C—C—C—C—C—C—C—C—$C_x$—, wherein x is the number of additional carbon atoms present to provide together with the substituents on the polymer chain the molecular weight desired for the fluoropolymer, and making the fluoropolymer solid. Fluoropolymers having molecular weights of at least 50,000 (Mn) are commercially available, making it convenient to use these fluoropolymers in their thermally destabilizable form in the mixture of the present invention. Preferred fluoropolymers are those that are melt-processable tetrafluoroethylene copolymers, for example comprising at least 40-99 mol % tetrafluoroethylene (TFE) derived (by polymerization) repeat units and 1-60 mol % of units derived from at least one other comonomer. Preferred comonomers with TFE to form perfluoropolymers are perfluoroolefins having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers in these TFE copolymers and those described below are those in which the alkyl group contains 1, 2, or 3 carbon atoms, and the copolymer can be made using several PAVE monomers. Preferred TFE copolymers include FEP (TFE/HFP copolymer and TFE/HFP/PAVE copolymer) and PFA (TFE/PAVE copolymer), wherein PAVE is most preferably perfluoro(ethyl vinyl ether) (PEVE) or perfluoro(propyl vinyl ether) (PPVE), or the combination of perfluoro(methyl vinyl ether) (PMVE) and PPVE, i.e. TFE/PMVE/PPVE copolymer, sometimes referred to as MFA in this field. Less preferred is a fluoropolymer that has —$CH_2$— units in the polymer chain, such as THV (TFE/HFP/$VF_2$ copolymer). The FEP preferably contains 5 to 17 wt % HFP, the remainder being TFE, with PAVE content if present being 0.2 to 2 wt % based on the total weight of the FEP. The PFA preferably contains at least 2 wt % PAVE, the remainder being TFE, based on the total weight of the PFA.

The fluoropolymer is at least 50 wt % fluorine, preferably at least 60 wt %, and more preferably at least 70 wt % fluorine, based on the total weight of the polymer chain (excludes end groups). In one embodiment of the present invention, if hydrogen is present in the repeat units making up the polymer chain, it is preferred that hydrogen is only mono-substituted on any of the carbon atoms making up the polymer chain or in any side group bonded to the polymer chain, since the presence of —$CH_2$— can impair the non-flammability of the fluoropolymer. Preferably, the hydrogen content, if any, is no greater than 2 wt %, more preferably no greater than 1 wt %, most preferably no greater than 0.5 wt %, based on the total weight of the fluoropolymer. A small amount of hydrogen along the polymer chain can have the beneficial effect of thermally destabilizing the fluoropolymer, thereby assisting its combustion abatement effect. The small amount of hydrogen present in the fluoropolymer contributes to the abatement of combustion by the mode of action (v). In another embodiment of the present invention, the fluoropolymer is a perfluoropolymer. By perfluoropolymer is meant that the monovalent substituents on the carbon atoms forming the polymer chain of the polymer are all fluorine atoms, with the possible exception of end groups.

In contrast to the fluoropolyether combustion abatement agent, which is in the liquid state, the fluoropolymer is in the solid state at least at the normal operating conditions encountered by the Li-ion battery, up to 40° C., sometimes up to 50° C. and higher, e.g. up to 60° C. and even up to 80° C. at the pressure of one atmosphere. At higher temperatures, the fluoropolymer may melt. Preferably, however, the melting temperature of the fluoropolymer is at least 200° C. and not greater than 315° C. Alternatively, the fluoropolymer may be one which softens upon heating, rather than having a distinct melting temperature. In either case, the fluoropolymer is preferably melt-flowable. Nevertheless, the fluoropolymer remains solid at the normal operating conditions of the Li-ion battery. The melt flowability can be characterized by a melt flow rate (MFR) of at least 0.01 g/10 min, preferably at least 0.1 g/10 min, more preferably at least 5 g/10 min or at least 10 g/10 min, all as measured in accordance with ASTM D 1238, under conditions of melt temperature and weight on the molten polymer that is prescribed for the particular fluoropolymer. For PFA and FEP, the prescribed temperature and weight is 372° C. and 5 kg, respectively.

The fluoropolymers are known for their thermal stability, especially arising from the strong chemical bonding between carbon and fluorine atoms predominating in the fluoropolymer. It is common, however, for the as-polymerized solid fluoropolymer to have thermally unstable moieties, especially unstable end groups, arising from ingredients providing free radicals in the aqueous polymerization medium during the polymerization reaction. As many or more than a total of at least 300 unstable end groups, more often at least 400 such end groups —COOH, —COF, and/or —CONH$_2$, per 10$^6$ carbon atoms can be present in the as-polymerized fluoropolymer. For example, the common persulfate polymerization initiator in the aqueous polymerization medium results in the formation of carboxyl end groups, —COOH, on the polymer chain. These groups decompose at elevated temperatures, indicating the thermal instability of the fluoropolymer. The decomposition is the splitting off of the carboxyl end groups, leaving behind the reactive group CF$_2$—, which can lead to the formation of a new unstable end group, perfluorovinyl, —CF=CF$_2$, extending into the polymer chain. Before such destabilizable fluoropolymers are made available by the manufacturer for commercial use, the fluoropolymer is subjected to a stabilization process that replaces unstable end groups by stable end groups. For example, FEP is subjected to humid heat treatment at high temperatures to replace unstable end groups by the stable —CF$_2$H end group. Both FEP and PFA are subjected to fluorination treatment to replace unstable end groups by the stable —CF$_3$ end group.

The destabilizable fluoropolymer used as a combustion abatement agent in the present invention is preferably not end-group stabilized, but is instead used in its thermally destabilizable form, i.e. the thermally unstable moieties such as the unstable end groups are present in the fluoropolymer. The heating up by the Li-ion battery caused by such corruption as improper recharging or short circuiting results in the heating of the fluoropolymer to cause decomposition of unstable moieties. This decomposition results in non-combustible volatiles being emitted from the fluoropolymer. These volatiles abate combustion, either preventing it from occurring, confining it if it does occur, or instantaneously extinguishing the fire. The combustion volatiles provide at least mode of action (v) in combustion abatement.

A preferred destabilizable fluoropolymer is the FEP mentioned above, but with end groups not being stabilized, so as to possess the unstable end groups mentioned above.

Another embodiment of thermally destabilizable fluoropolymer is the fluoropolymer that contains thermally destabilizable groups, such as —CH$_2$—CH$_2$— or —CH$_2$—, in the polymer chain in the small amount as mentioned above that provides thermal decomposition of the fluoropolymer without imparting flammability to the fluoropolymer.

Such thermally unstable groups can be present in combination with thermally unstable end groups such as disclosed above. A preferred thermally destabilizable fluoropolymer that contains at least polymer (main) chain thermally instability is the copolymer of TFE, HFP and ethylene, with the amount of ethylene in the copolymer being small to satisfy the preferred maximum hydrogen contents mentioned above. The TFE and HFP contents of the TFE/HFP/ethylene copolymer can be the same as for the FEP dipolymer mentioned above.

The thermally destabilizable fluoropolymer is preferably one that becomes flowable under the heating provided by the corrupted Li-ion battery. In the case of fluoropolymers that have a melting temperature, such heating exceeds the melting temperature. The fluoropolymer either softens sufficiently upon such heating that it becomes molten and flowable or melts to become melt flowable. The heating provided by the corrupted battery changes the fluoropolymer from the solid state to the liquid state. This flowing of the fluoropolymer contributes to the exclusion of oxygen from combustible vapors arising from overheated electrolyte, and/or containment of the fire. The melt flow can be sufficient to seal the Li-ion battery from which combustible vapors would otherwise escape.

The thermally destabilizable fluoropolymer can be fabricated into sheets that can be used as insulators such as top and bottom insulators 22 and 24 (FIGS. 1, 3, and 6) and top insulator 74 such as by compression molding at a temperature just above the melting temperature of the fluoropolymer.

In another embodiment of the present invention, the combustion abatement agent used in the present invention is a combination of combustion abatement agents. This combination can expose the corrupted Li-ion battery, the region of electrochemical activity 20 where the corruption is occurring, to multiple modes of action for abating combustion. This combination can make use of the liquid fluoropolyether combustion abatement agent, but in a semi-solid form that may be more convenient for application within the Li-ion battery. This conversion from the liquid state to semi-solid state is done by mixing with the liquid fluoropolyether particulate combustion abatement agent such as those described above, whether an inorganic compound, an organic compound, or solid fluoropolymer in an amount effective to obtain the semi-solid state.

By semi-solid (state) is meant, that the composition is not a liquid under the normal conditions of temperature and pressure mentioned above. Preferably, this semi-solid state persists at the higher temperatures encountered in the normal operation of that the Li-ion battery, including recharging, when the battery is a rechargeable battery. Normal operation of the battery can include ambient temperature (15-25° C.) and higher temperatures up to 40° C., sometimes up to 50° C. and even higher, e.g. temperatures up to 60° C. and even up to 80° C. and for simplicity, under a pressure of one atm. The semi-solid state of the composition differs from the liquid state by not being flowable at any of these temperatures and pressure conditions. In contrast, the liquid state denotes flowability so as to take the shape of its container, while having a fixed volume. Instead of flowability, the semi-solid state of the composition means that it has rigidity, whereby it stays where it is positioned with respect to the battery. This positioning of the composition is facilitated by the characteristic of the semi-solid state of the mixture, namely that the mixture is flowable enough under pressure for achieving intimate contact with desired surfaces with respect to the battery, e.g. the filling of a chamber such as chambers 28, 42, and 54. The applied pressure may be only that of a hand trowel used to apply, spread, or pack the semi-solid to achieve the contact or filling desired. Once applied and the pressure is removed, the semi-solid state of the fluorinated material results it not flowing away from its applied position under the normal conditions of the Li-ion battery. Characteristic of being semi-solid, the composition in this semi-solid state has the consistency of wax, dough, or putty, the stiffness of which can be controlled for example by the molecular weight of the fluoropolyether, the amount solid additive to the resultant composition to thicken it to become the semi-solid state, and the particle size of the solid additive when the fluoropolyether and solid additive, which can be combustion abatement agent as mentioned above, are mixed together. In any event, the molecular weight of the fluoropolyether is low enough that it is in the liquid state under normal conditions and preferably under the normal operating conditions of the Li-ion battery, whereby the liquid fluoropolyether would have a boiling temperature (at one atm) greater than 80° C. The semi-solid state can be characterized by exhibition of a tensile strength of zero typically by virtue of the inability to form tensile test specimens that have sufficient integrity to be tensile strength tested.

Another solid fluoropolymer that can be added to liquid fluoropolyether for thickening it to form a mixture that has the semi-solid state is low molecular weight polytetrafluoroethylene, which is commonly known as PTFE micropowder, so as to distinguish from polytetrafluoroethylene (PTFE), which has such a high molecular weight that it does not flow in the molten state described above. While the molecular weight of PTFE micropowder is low relative to PTFE, it is high enough to provide a solid polymer. As solid polymer, the PTFE micropowder is commercially available as a powder, which maintains is powder state by not being putty-like, i.e. the PTFE micropowder is not in a semi-solid state. Instead, the PTFE micropowder in the powder state form consists of particles sufficiently hard that the PTFE micropowder in powder form is free flowing. The result of the lower molecular weight of PTFE micropowder than PTFE is that it has fluidity in the molten state, i.e. melt flowability. The melt flowability of PTFE micropowder can be characterized by a melt flow rate (MFR) of at least 0.01 g/10 min, preferably at least 0.1 g/10 min and more preferably at least 5 g/10 min, and still more preferably at least 10 g/10 min, as measured in accordance with ASTM D 1238, at 372° C. using a 5 kg weight on the molten polymer. The PTFE micropowder by itself is not melt fabricable, i.e. an article molded from the melt of PTFE micropowder is useless, by virtue of extreme brittleness. Because of its low molecular weight (relative to non-melt-flowable PTFE), it has no strength. An extruded filament of PTFE micropowder is so brittle that it breaks upon flexing.

The combustion abatement agent that is a combination of materials can be made by mixing the materials together, preferably wherein one of these materials is the liquid fluoropolyether and preferably at least one other component of the mixture is a different combustion abatement agent, preferably to obtain the resultant composition being in the semi-solid state as described above. If solid fluoropolymer and/or decomposition catalyst are to be present in the composition, these can be included in the mixing step. The particles of the solid fluoropolymer can be those that result from the polymerization process to make the fluoropolymer. For example, aqueous dispersion polymerization typically results in the formation of fluoropolymer particles having an average particle size of no greater than 0.5 micrometers as measured by laser light scattering. Recovery of the fluoropolymer particles from the aqueous polymerization medium results in aggregation of the primary particles from the polymerization process to form secondary particles of agglomerated primary particles, the secondary particles typically having an average particle size of 200 to 800 micrometers as measured by laser light scattering (ASTM D 4464). The particle size of the added combustion abatement agent as a compound, solid fluoropolymer, and catalyst is preferably that which is effective to produce a homogeneous semi-solid mixture with the liquid fluoropolyether. Preferably the average particle size (by light scattering according to ASTM D 4464) of these components is in the range of 0.1 to 800 micrometers).

The mixing step can be carried out at ambient temperature (15-25° C.) for convenience. The mixing can be carried out by hand or by mechanical means. The components are added to the mixing vessel and subjected to mixing. When a particulate solid is being mixed preferably with a liquid, the mixture is complete when no concentration of either component is visible. Instead, a homogeneously appearing mixture, that is preferably semi-solid, is obtained. It is preferred that homogeneity is retained during the use of the composition over the life of the Li-ion battery, but this homogeneity can be unnecessary when the composition is applied in confinement with respect to the Li-ion battery. Confinement of the composition maintains the presence of the components of the composition even when separated within the confinement space (chamber).

With respect to proportions of components in the combustion abatement agent as a composition, the amount of particulate solid materials or simply particulate solids, whether being combustion abatement agent other than fluoropolymer or the combination of such combustion abatement agent and fluoropolymer, whether thermally destabilizable or just fluoropolymer thickener, present in the composition is preferably effective to convert the liquid state of the fluoropolyether to semi-solid state. This amount will depend on the molecule weight of the fluoropolyether and the particle size of the solids present and the amount of the solids being mixed. The higher the molecular weight of the fluoropolyether, the higher is its viscosity, meaning that less of the particulate solids will be needed for the conversion to the semi-solid state. The smaller the particle size of the particulate solids, the less of these solids will be needed to accomplish this conversion. With respect to the particulate solids being combustion abatement agent other than fluoropolymer, it is preferred that the semi-solid composition comprises at least 70 wt %, more preferably at least 60 wt %, and most preferably at least 50 wt % liquid fluoropolyether, the remainder to total 100 wt % being the particulate solids. It is also preferred that at least 3, 4, or 5 wt % of the composition comprises the particulate solids, the remainder to total 100 wt % being the liquid fluoropolyether, whereby the maximum amount of liquid fluoropolyether is 97 wt %, 96 wt %, and 95 wt %, respectively. Additional preferred minimums of particulate solids applicable to the are at least 10 wt %, at least 15 wt %, at least 20 wt % at least 25 wt %, at least 30 wt %, at least 35 wt %, or at least 40 wt %, the remainder to total 100 wt % being the combination of liquid fluoropolyether and particulate solids. In one embodiment, these composition ranges apply to the combination of liquid fluoropolyether and combustion abatement agent(s) other than fluoropolymer as the particulate solid, to total 100 wt %. In another embodiment, these composition ranges apply to the combination of liquid fluoropolyether, and combustion abatement agent other than fluoropolymer and/or fluoropolymer as particulate solids, whether PTFE micropowder or thermally destabilizable fluoropolymer, this combination together with the liquid fluoropolyether totaling 100 wt % of the composition of these components. According to this embodiment, the weight % of particulate solids mentioned above apply to the combination of combustion abatement agent other than fluoropolymer and fluoropolymer. Preferably, however, at least 3, 4, or 5 wt %, at least 10 wt %, at least 20 wt %, at least 25 wt %, or at least 30 wt % of the combined weight of the liquid fluoropolyether, combustion abatement agent other than fluoropolymer, and fluoropolymer, is the combustion abatement agent other than fluoropolymer. Preferably, the fluoropolymer component comprises at least 50 wt % of the thermally destabilizable fluoropolymer. The decomposition catalyst amount, if any is present, in the composition is not included in these composition ranges. The catalyst amount is based on the weight of fluoropolyether as mentioned above.

EXAMPLES

Example 1

The cathode electrode for the lithium cylindrical cell was fabricated from a mixture of LiMn0.33Ni0.33Co0.33O$_2$ electrode powder, polyvinylidene difluoride (PVDF) polymer binder, and graphite slurried in 1-methyl-2-pyrrolidinone (NMP). The anode electrode was fabricated from graphite, PVDF and NMP. The cathode electrode was cast from the slurry onto an aluminum current collector foil and on a copper current collector foil for anode electrode. The electrolyte was 1 M LiPF$_6$ in ethylene carbonate (EC): diethyl carbonate (DEC). A polypropylene separator was used in the process to wind a battery cell core. The wound core elements (jelly roll) were inserted in a metal can depicted in FIG. 1, closed and sealed. The metal can assembly as depicted in FIG. 1 has a steel can 6 and a steel battery top 8, which is the positive pole of the battery. The can 6 is the negative pole of the battery. The two poles are insulated from one another by a u-shaped polymer insulator ring 10 positioned between the positive and negative poles where proximate to one another. Positioned within the u-shape of the insulator ring 10 are a disc 12 having an aperture 14 therewithin and a scored polyamide rupture disc 16 forming a closure of aperture 14, all pressed together by the crimp 18 encircling the can 6 as shown. The wound core elements (region of electrochemical activity 20) within the battery sits inside insulated sides of the can 6 and sheet insulators 22 and 24 covering the top and bottom, respectively, of the wound core elements. A center pin 26 sits in the center of the wound core elements. The insulators 22 and 24 are both sheets of flame retardant polyvinyl alcohol. The space between the top insulator 22 and rupture disc 16 forms chamber 28 containing combustion abatement agent.

The assembled battery cell was fully charged and then a nail was driven through the sides of the can so that the nail penetrates partway through the wound core elements shorting the charged battery resulting in a rapid temperature increase inside the battery. Pressure builds inside the battery can assembly until the top insulator 22 failed exposing the combustion abatement material, in this case an 80:20 (by weight) mixture of PFPE and Al(OH)$_3$, in chamber 28 to wound core elements that are rapidly increasing in temperature above 100° C. Rapidly there is a generation of smoke and a flame that was presumably sparked by arcing from the shorting process in the battery. The combustion abatement material quickly extinguished the flame and the wound core elements began to cool. Within a few minutes the entire battery cell assembly temperature dropped below 100° C. and posed no fire hazard.

The PFPE used in the experiment of this Example and in the experiments of the remaining Examples is the PFPE (fluorinated composition) used in Example 1 of U.S. Patent Publication 2014/0065461.

Example 2

The wound core elements (jelly roll) were identical to EXAMPLE 1. The wound core elements (jelly roll) were inserted in a metal can depicted in FIG. 1, closed and sealed. The metal can assembly as depicted in FIG. 1 has a steel can 6 and a steel battery top 8, which is the positive pole of the battery. The can 6 is the negative pole of the battery. The two poles are insulated from one another by a u-shaped polymer insulator ring 10 positioned between the positive and negative poles where proximate to one another. Positioned within the u-shape of the insulator ring 10 are a disc 12 having an aperture 14 therewithin and a scored polyamide rupture disc 16 forming a closure of aperture 14, all pressed together by the crimp 18 encircling the can 6 as shown. The wound core elements (region of electrochemical activity 20) within the battery sits inside insulated sides of the can 6 and sheet insulators 22 and 24 covering the top and bottom, respectively, of the wound core elements. A center pin 26 sits in the center of the wound core elements. The insulators 22 and 24 are both sheets of flame retardant polyvinyl alcohol. An additional chamber 42 is included and filled with the same combustion abatement agent as chamber 28.

The assembled battery cell was fully charged and then a nail was driven through the sides of the can so that the nail penetrates partway through the wound core elements shorting the charged battery resulting in a rapid temperature increase inside the battery. Pressure builds inside the battery can assembly until the top and bottom insulators 22 and 24 failed exposing the combustion abatement material, in this case an 80:20 (by weight) mixture of PFPE and Al(OH)$_3$, in chambers 28 and 42 to wound core elements that are rapidly increasing in temperature above 100° C. Rapidly there is a generation of smoke and a flame that was presumably sparked by arcing from the shorting process in the battery. The combustion abatement material quickly extinguished the flame and the wound core elements began to cool. Within a few minutes the entire battery cell assembly temperature dropped below 100° C. and posed no fire hazard.

Example 3

The wound core elements (jelly roll) were identical to EXAMPLE 1. The wound core elements (jelly roll) were inserted in a metal can depicted in FIG. 3 with the exception that chamber 28 was empty and did not contain any combustion abatement agent, closed and sealed. The combustion abatement agent is located only in chamber 42. The metal can assembly as depicted in FIG. 3 has a steel can 6 and a steel battery top 8, which is the positive pole of the battery. The can 6 is the negative pole of the battery. The two poles are insulated from one another by a u-shaped polymer insulator ring 10 positioned between the positive and negative poles where proximate to one another. Positioned within the u-shape of the insulator ring 10 are a disc 12 having an aperture 14 therewithin and a scored polyamide rupture disc 16 forming a closure of aperture 14, all pressed together by the crimp 18 encircling the can 6 as shown. The wound core elements (region of electrochemical activity 20) within the battery sits inside insulated sides of the can 6 and sheet insulators 22 and 24 covering the top and bottom, respectively, of the wound core elements. A center pin 26 sits in the center of the wound core elements. The insulators 22 and 24 are both sheets of flame retardant polyvinyl alcohol.

The assembled battery cell was fully charged and then a nail was driven through the sides of the can so that the nail penetrates partway through the wound core elements shorting the charged battery resulting in a rapid temperature increase inside the battery. Pressure builds inside the battery can assembly until the top and bottom insulators 22 and 24 failed exposing the combustion abatement material, in this case an 80:20 (by weight) mixture of PFPE and $Al(OH)_3$, in chamber 42 to wound core elements that are rapidly increasing in temperature above 100° C. A partial vacuum forms in chamber 28 after the rupture disc 16 fails and gases begin to escape through the top of the battery can assisting drawing the combustion agent in chamber 42 to come into contact with the wound core elements in the region of electrochemical activity 20. Rapidly there is a generation of smoke and a flame that was presumably sparked by arcing from the shorting process in the battery. The combustion abatement material quickly extinguished the flame and the wound core elements began to cool. Within a few minutes the entire battery cell assembly temperature dropped below 100° C. and posed no fire hazard.

Example 4

The wound core elements (jelly roll) were identical to EXAMPLE 1. The wound core elements (jelly roll) were inserted in a metal can depicted in FIG. 1 with the exception that chamber 28 was empty and did not contain any combustion abatement agent, closed and sealed. A multilayer sheet 48 containing combustion abatement agent as depicted in FIG. 4 and FIG. 5, was placed around wound core elements before insertion into the can, then the can is closed and sealed. The sheet 48 was made of films 50 and 52, which were flame retardant polyvinyl alcohol, and the chamber 54 was filled with combustion abatement agent. The entire battery cell has a steel can 6 and a steel battery top 8, which is the positive pole of the battery. The can 6 is the negative pole of the battery. The two poles are insulated from one another by a u-shaped polymer insulator ring 10 positioned between the positive and negative poles where proximate to one another. Positioned within the u-shape of the insulator ring 10 are a disc 12 having an aperture 14 therewithin and a scored polyamide rupture disc 16 forming a closure of aperture 14, all pressed together by the crimp 18 encircling the can 6 as shown. The wound core elements (region of electrochemical activity 20) within the battery sits inside insulated sides of the can 6 and sheet insulators 22 and 24 covering the top and bottom, respectively, of the wound core elements. A center pin 26 sits in the center of the wound core elements. The insulators 22 and 24 are both sheets of flame retardant polyvinyl alcohol.

The assembled battery cell was fully charged and then a nail was driven through the sides of the can so that the nail penetrates partway through the wound core elements shorting the charged battery resulting in a rapid temperature increase inside the battery. Temperature and pressure rises inside the battery can assembly until the top and bottom insulators 22 and 24 and the films of flame retardant polyvinyl alcohol 50 and 52 failed exposing the combustion abatement agent 50, in this case an 80:20 (by weight) mixture of PFPE and $Al(OH)_3$, to wound core elements that are rapidly increasing in temperature above 100° C. A partial vacuum forms in chamber 28 after the rupture disc 16 fails and gases begin to escape through the top of the battery can assisting drawing the combustion agent to come into contact with the wound core elements in the region of electrochemical activity 20. Rapidly there is a generation of smoke and a flame that was presumably sparked by arcing from the shorting process in the battery. The combustion abatement material quickly extinguished the flame and the wound core elements began to cool. Within a few minutes the entire battery cell assembly temperature dropped below 100° C. and posed no fire hazard.

Example 5

The wound core elements (jelly roll) were identical to EXAMPLE 1. The wound core elements (jelly roll) were inserted in a metal can depicted in FIG. 1, closed and sealed. The metal can assembly as depicted in FIG. 1 has a steel can 6 and a steel battery top 8, which is the positive pole of the battery. The can 6 is the negative pole of the battery. The two poles are insulated from one another by a u-shaped polymer insulator ring 10 positioned between the positive and negative poles where proximate to one another. Positioned within the u-shape of the insulator ring 10 are a disc 12 having an aperture 14 therewithin and a scored polyamide rupture disc 16 forming a closure of aperture 14, all pressed together by the crimp 18 encircling the can 6 as shown. The wound core elements (region of electrochemical activity 20) within the battery sits inside insulated sides of the can 6 and sheet insulators 22 and 24 covering the top and bottom, respectively, of the wound core elements. A center pin 26 sits in the center of the wound core elements. The insulators 22 and 24 are both sheets of flame retardant polyvinyl alcohol. The space between top insulator 22 and rupture disc 16 forms chamber 28 containing combustion abatement agent.

The assembled battery cell was fully charged and then a nail was driven through the sides of the can so that the nail penetrates partway through the wound core elements shorting the charged battery resulting in a rapid temperature increase inside the battery. Pressure builds inside the battery can assembly until the top insulator 22 failed exposing the combustion abatement material, in this case an 80:20 (by weight) mixture of PFPE and $Al(OH)_3$ as well as a small amount of the Lewis Acid $BF_3$ evenly dispersed in this mixture, in chamber 28 to wound core elements that are rapidly increasing in temperature above 100° C. Rapidly there is a generation of smoke and a flame that was presumably sparked by arcing from the shorting process in the battery. The combustion abatement material quickly extinguished the flame and the wound core elements began to cool. Within a few minutes the entire battery cell assembly temperature dropped below 100° C. and posed no fire hazard.

Example 6

The wound core elements (jelly roll) were identical to EXAMPLE 1. The wound core elements (jelly roll) were inserted in a metal can depicted in FIG. 1, closed and sealed. The metal can assembly as depicted in FIG. 1 has a steel can 6 and a steel battery top 8, which is the positive pole of the battery. The can 6 is the negative pole of the battery. The two poles are insulated from one another by a u-shaped polymer insulator ring 10 positioned between the positive and negative poles where proximate to one another. Positioned within the u-shape of the insulator ring 10 are a disc 12 having an aperture 14 therewithin and a scored polyamide rupture disc 16 forming a closure of aperture 14, all pressed together by the crimp 18 encircling the can 6 as shown. The wound core elements (region of electrochemical activity 20) within the battery sits inside insulated sides of the can 6 and sheet insulators 22 and 24 covering the top and bottom, respectively, of the wound core elements. A center pin 26 sits in the center of the wound core elements. The insulators 22 and 24 are both sheets of flame retardant polyvinyl alcohol. The space between top insulator 22 and rupture disc 16 forms chamber 28 containing combustion abatement agent.

The assembled battery cell was fully charged and then a nail was driven through the sides of the can so that the nail penetrates partway through the wound core elements shorting the charged battery resulting in a rapid temperature increase inside the battery. Pressure builds inside the battery can assembly until the top insulator 22 failed exposing the combustion abatement material, in this case an 60:40 (by weight) mixture of PFPE and thermally destabilizable fluoropolymer, namely FEP having its end groups not stabilized thereby being thermally unstable, in chamber 28 to wound core elements that are rapidly increasing in temperature above 100° C. Rapidly there is a generation of smoke and a flame that was presumably sparked by arcing from the shorting process in the battery. The combustion abatement material quickly extinguished the flame and the wound core elements began to cool. Within a few minutes the entire battery cell assembly temperature dropped below 100° C. and posed no fire hazard.

Example 7

The wound core elements (jelly roll) were identical in compositions and electrode/separator construction to EXAMPLE 1, except the jelly roll was flattened into a typical shape of a prismatic battery. The flattened wound core elements region of electrochemical activity 20) were inserted into a pouch constructed from a multilayer sheet 48 such as depicted in FIG. 4 and FIG. 5, closed and sealed. The film 52 of the sheet 48 is an aluminum foil having an outer layer of polyamide and layer of polypropylene on the inside, with the chamber 54 containing combustion abatement agent. Film 50 is of flame retardant polyvinyl alcohol facing and in contact with the wound core elements forming the region of electrochemical activity. Separate metal tabs were connected to the wound core elements and individually extend outside the pouch for the positive and negative poles of the "prismatic" battery.

The assembled battery cell was fully charged and then a nail was driven through the sides of the pouch so that the nail penetrates partway through the wound core elements shorting the charged battery resulting in a rapid temperature increase inside the battery. As temperature and pressure rises inside the battery pouch assembly the flame retardant polyvinyl alcohol film 52 is breeched exposing the combustion abatement agent, in this case an 80:20 (by weight) mixture of PFPE and $Al(OH)_3$. Rapidly there is a generation of smoke and a flame that was presumably sparked by arcing from the shorting process in the battery. The combustion abatement agent quickly extinguished the flame and the wound core elements began to cool. Within a few minutes the entire battery cell assembly temperature dropped below 100° C. and posed no fire hazard.

Essentially the same result was obtained in the experiments in the foregoing EXAMPLES when the combustion abatement agent used therein was separately replaced by the following compositions: (a) 95 wt % of the PFPE and 5 wt % of hydrated magnesium silicate and (b) 67 wt % of the PFPE and 33 wt % of the thermally destabilizable fluoropolymer used in EXAMPLE 6.

What is claimed is:

1. A process for forming a Li-ion battery having a region of electrochemical activity and an enclosure therefor, said process comprising:
    forming a first chamber within said enclosure separate from said region of electrochemical activity;
    providing a vent in said enclosure;
    positioning said first chamber between said vent and said region of electrochemical activity; and
    positioning a composition comprising at least one combustion abatement agent within said first chamber, wherein said at least one combustion abatement agent comprises liquid fluoropolyether, whereby said composition is not in contact with said region of electrochemical activity;
    said first chamber being pressure and/or heat sensitive, whereby when said region of electrochemical activity overheats, said first chamber is breached, allowing said at least one combustion abatement agent to contact said region of electrochemical activity to abate combustion of said region of electrochemical activity, and said vent releases pressure upon said overheating.

2. The process of claim 1 further comprising positioning a first membrane between said first chamber and said region of electrochemical activity.

3. The process of claim 2, wherein said first membrane is breachable by said overheating to thereby release said combustion abatement agent into said region of electrochemical activity to abate combustion therewithin.

4. The process of claim 3, wherein said first membrane is breachable by rupture by said overheating.

5. The process of claim 3, wherein said first membrane is breachable by melting by said overheating.

6. The process of claim 2, wherein said first membrane comprises a thermally-destabilizable fluoropolymer.

7. The process of claim 6, wherein said thermally-destabilizable fluoropolymer is selected from the group consisting of a tetrafluoroethylene/hexafluoropropylene copolymer and a tetrafluoroethylene/hexafluoropropylene/perfluoro(alkyl vinyl ether) copolymer.

8. The process of claim 6, wherein said thermally-destabilizable fluoropolymer has at least 300 unstable end groups per $10^6$ carbon atoms, said end groups being selected from the group consisting of —COOH, —COF, and —$CONH_2$.

9. The process of claim 1, wherein said enclosure comprises metal foil.

10. The process of claim 1, wherein said enclosure is a can.

11. The process of claim 1, wherein said composition further comprises decomposition catalyst and solid material.

12. The process of claim 11, wherein said at least one combustion abatement agent further comprises said solid material.

13. The process of claim 11, wherein said decomposition catalyst comprises a Lewis acid.

14. The process of claim 11, wherein said composition is in a semi-solid state.

15. The process of claim 1, wherein said liquid fluoropolyether is a perfluoropolyether.

16. The process of claim 1 further comprising providing a closure on said vent such that said closure opens said vent and releases said pressure through said vent, the opening of said vent accompanying the rupture of said first membrane.

17. A process for forming a Li-ion battery having a region of electrochemical activity and an enclosure therefor, said process comprising:

forming a first chamber within said enclosure separate from said region of electrochemical activity and forming a second chamber remote from said first chamber within said enclosure, wherein said second chamber comprises a second membrane breachable by overheating;

positioning a composition comprising at least one combustion abatement agent within said first chamber, wherein said at least one combustion abatement agent comprises liquid fluoropolyether, whereby said composition is not in contact with said region of electrochemical activity, said first chamber being pressure and/or heat sensitive, whereby when said region of electrochemical activity overheats, said first chamber is breached, allowing said at least one combustion abatement agent to contact said region of electrochemical activity to abate combustion of said region of electrochemical activity; and positioning a vent at an end of said enclosure and positioning said second chamber between said vent and said region of electrochemical activity, whereby said combustion abatement agent from each of said first chamber and said second chamber is released into said region of electrochemical activity upon said overheating to thereby abate combustion within said region of electrochemical activity.

18. The process of claim 17, wherein said second membrane is breachable by rupture by said overheating.

19. The process of claim 17, wherein said second membrane is breachable by melting by said overheating.

20. The process of claim 17, wherein said second membrane comprises a thermally-destabilizable fluoropolymer.

21. The process of claim 20, wherein said thermally-destabilizable fluoropolymer is selected from the group consisting of a tetrafluoroethylene/hexafluoropropylene copolymer and a tetrafluoroethylene/hexafluoropropylene/perfluoro(alkyl vinyl ether) copolymer.

22. The process of claim 20, wherein said thermally-destabilizable fluoropolymer has at least 300 unstable end groups per $10^6$ carbon atoms, said end groups being selected from the group consisting of —COOH, —COF, and —CONH$_2$.

23. The process of claim 17 further comprising positioning a first membrane between said first chamber and said region of electrochemical activity, wherein said first membrane is breachable by said overheating to thereby release said combustion abatement agent into said region of electrochemical activity to abate combustion therewithin.

24. The process of claim 23, wherein said first membrane comprises a thermally-destabilizable fluoropolymer.

25. The process of claim 17, wherein said enclosure comprises metal foil.

26. The process of claim 17, wherein said enclosure is a can.

* * * * *